July 21, 1936.  F. G. BOVARD  2,047,994

CONDUCTOR SUPPORT

Filed May 29, 1935

INVENTOR
*Floyd G. Bovard*
BY *Alphens J. Crane*
ATTORNEY

Patented July 21, 1936

2,047,994

UNITED STATES PATENT OFFICE 2,047,994

CONDUCTOR SUPPORT

Floyd G. Bovard, Akron, Ohio, assignor to The Ohio Brass Company, Mansfield, Ohio, a corporation of New Jersey Application May 29, 1935, Serial No. 23,985

1 Claim. (Cl. 248—63)

This invention relates to suspension clamps for electrical transmission lines and has for one of its objects the provision of a clamp for comparatively light lines that shall be simple and economical t omanufacture, easy to install and efficient in operation.

The invention is exemplified by the combination and arrangement of parts shown in the accompanying drawing and described in the following specification, and it is more particularly pointed out in the appended claim.

Figure 1:
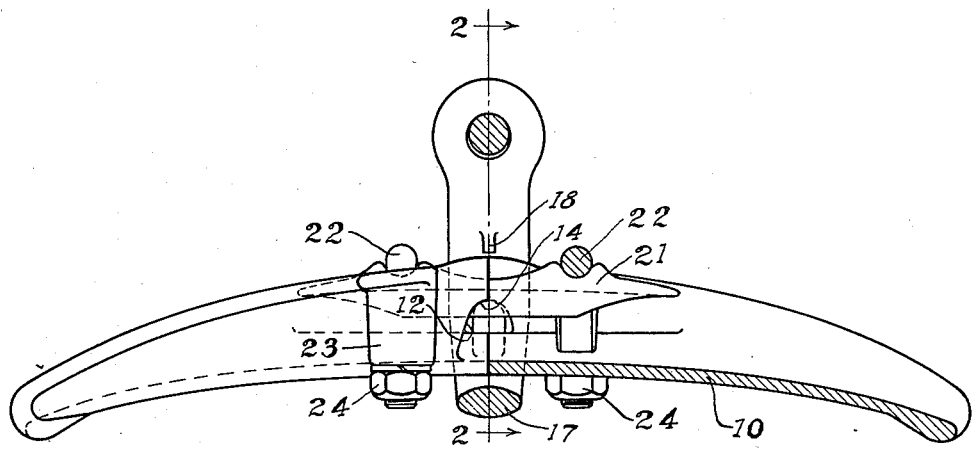
Fig. 1 is an elevation with parts in section showing one embodiment of the present invention.

The clamp as illustrated in the drawing comprises a body or seat member 10 curved downwardly at its opposite ends to avoid an abrupt shoulder at the point where the cable leaves the seat and to provide for the sag angle of the cable as it leaves its point of support. The seat is transversely curved, as indicated at 11 in Fig. 2, to conform to the curvature of the supported cable.

Figure 2:
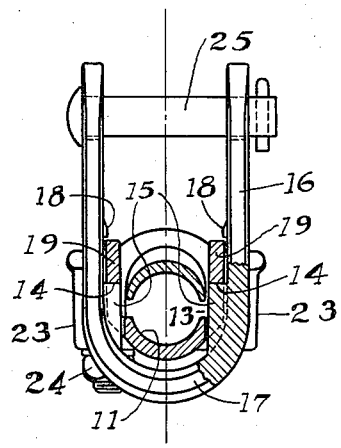
Fig. 2 is a section on line 2—2 of Fig. 1.

At the mid point of the seat, the side walls of the cable seat are provided with pockets 12 which cut entirely through the side walls, as indicated at 13 in Fig. 2, and provide shoulders 14 for receiving supporting lugs 15 on a yoke member 16. The lugs 15 and shoulders 14 are arc shaped so as to provide a supporting trunnion upon which the seat 10 may rock to accommodate itself to various angular positions of the cable and to permit vibration waves to pass the support without material interruption, such as would cause destructive vibration of the cable relative to its supporting seat. The arms of the supporting yoke 16 are connected by a cross member 17 at the lower end of the yoke. This connection is important as it prevents spreading of the lower end of the yoke and holds the lugs 15 in place in their seats formed by the pockets 12. In order that the cross member 17 may be effective in preventing spreading of the yoke at the pintles, it is located as closely adjacent the pintles as practical without interfering with the normal pivotal movement of the seat member 10. It will be seen from Figs. 2 and 3 that the cross member 17 is arcuate in shape and substantially concentric with the cable, as this shape is the most effective in holding the yoke from spreading without interfering with the seat member. It is important from the manufacturing standpoint that the pockets extend entirely through the side walls of the seat 10 so as to leave an opening through the side walls. The seat 10 may be a malleable casting and the opening can be more accurately cored in a green sand mold if it extends entirely through the side wall than if it were closed at its inner side because there are no corners for the formation of fillets of iron or in which the sand might burn. Furthermore, where the openings extend entirely through, it is possible to pass a tool transversely of the seat member through the aligned openings to finish the bearing faces 14 which rest upon the pintles 15. It will be seen that the pintles 15 can be moved upwardly into their pockets from the lower side of the seat member.

In order to retain the yoke 16 in place, it is provided with stops 18 which are beveled on their upper ends and provided with square shoulders on the lower ends. As the yoke 16 is pressed upwardly into position, the arms will spring outwardly a sufficient amount to permit the lugs 18 to pass the bridge bars 19 above the pockets 12, and after the lugs 18 pass the top of the bridge bars the arms will spring inwardly, thus locking the yoke in place. This is especially valuable in preventing loss or separation of the parts during shipment. When the device is once installed, the lugs are not so essential since the seat is held in position by the weight of the cable.

The cable is held in its seat by means of a keeper piece 21 which is clamped upon the top of the cable by J or U-bolts 22. The seat member 10 is provided with lugs 23 for receiving the U-bolts and nuts 24 are threaded on the lower ends of the bolts to clamp the keeper piece against the cable. A clevis pin 25 connects the upper ends of the yoke arms and provides means for supporting the clamp. The upper edge of the bridge bars 19 are curved about the center of the pivotal support for the seat to permit rocking of the seat upon its support without intereference by the lugs 18 so that the lugs are closely adjacent the upper edges of the bridge bars for all positions of the seat relative to the supporting yoke. The pintles 15 are located closely adjacent the cross bar 17 so that there can be no danger of the arms of the yoke bending outwardly to dislodge the pintles from their supporting shoulders. The supporting surfaces of the pintles, as will be seen from Fig. 2, are much closer to the cross bar 17 than they are to the free ends of the yoke arms. This arrangement makes it possible to spring the arms outwardly a sufficient amount to permit the lugs 18 to pass the bars 19 but assures against spreading of the yoke under load and consequent dropping of the conductor.

Figure 3:
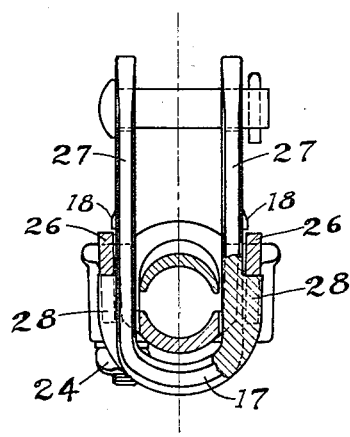
Fig. 3 is a view similar to Fig. 2 showing a slightly modified form of the invention.

In the modification shown in Fig. 3, the bridge bars shown at 26 are placed outside of the arms 27 of the supporting yoke instead of inside, as shown in Fig. 2. The pintle lugs 28 are also formed outside of the legs of the supporting yoke so as to register with the shoulders on the lower edges of the bridge bars 26. In other respects, the supporting clamp shown in Fig. 3 is similar to that shown in Figs. 1 and 2.

I claim:

A conductor support comprising an elongated seat member channel shaped in cross section, the side walls of said seat member having registering pockets formed therein and extending entirely through the side walls of said seat member below the upper edges of said side walls to provide bridge bars above said pockets having supporting shoulders on their lower edges, said pockets being open at their lower ends below said shoulders, a supporting yoke for said seat member comprising a pair of arms connected by a cross bar at their lower ends, each of said arms having a lug thereon closely adjacent said cross bar and arranged to enter said pockets from their lower ends when said yoke is moved upwardly over said seat member, the upper ends of said lugs and the shoulders on the lower edges of said bridge bars being shaped to provide for pivotal movement of said seat member when said shoulders rest on said lugs, and stops on said arms disposed above the upper edges of said bridge bars when said yoke is in place, said arms being sufficiently yieldable to permit said lugs to pass said bridge bars during assembly of said yoke on said seat member.

FLOYD G. BOVARD.